(12) United States Patent
Ould

(10) Patent No.: US 10,132,622 B2
(45) Date of Patent: Nov. 20, 2018

(54) METHOD AND APPARATUS FOR MEASURING A PART

(71) Applicant: RENISHAW PLC, Wotton-under-Edge, Gloucestershire (GB)

(72) Inventor: John Ould, Backwell (GB)

(73) Assignee: RENISHAW PLC, Wotton-under-Edge (GB)

( * ) Notice: Subject to any disclaimer, the term of this patent is extended or adjusted under 35 U.S.C. 154(b) by 517 days.

(21) Appl. No.: 14/765,188

(22) PCT Filed: Feb. 3, 2014

(86) PCT No.: PCT/GB2014/050285
§ 371 (c)(1),
(2) Date: Jul. 31, 2015

(87) PCT Pub. No.: WO2014/122437
PCT Pub. Date: Aug. 14, 2014

(65) Prior Publication Data
US 2015/0377617 A1  Dec. 31, 2015

(30) Foreign Application Priority Data

Feb. 5, 2013 (GB) .................................. 1302012.8
Mar. 27, 2013 (GB) .................................. 1305599.1

(51) Int. Cl.
*G01B 21/04* (2006.01)
*G01B 5/10* (2006.01)
(Continued)

(52) U.S. Cl.
CPC ............... *G01B 21/04* (2013.01); *G01B 5/10* (2013.01); *G01B 5/201* (2013.01); *G01B 5/213* (2013.01);
(Continued)

(58) Field of Classification Search
CPC ........ G01B 21/04; G01B 5/201; G01B 5/213; G01B 5/10; G05B 19/401; G05B 2219/37043
See application file for complete search history.

(56) References Cited

U.S. PATENT DOCUMENTS 3,866,829 A  2/1975 Egawa et al.
4,852,402 A  8/1989 Bertz
(Continued)

FOREIGN PATENT DOCUMENTS

CN  1637380 A  7/2005
CN  101166949 A  4/2008
(Continued)

OTHER PUBLICATIONS

Jul. 7, 2014 Written Opinion issued in International Patent Application No. PCT/GB2014/050285.
(Continued)

*Primary Examiner* — Mischita Henson
(74) *Attorney, Agent, or Firm* — Oliff PLC

(57) ABSTRACT

A method and apparatus for measuring a part with a contact probe mounted on a coordinate positioning machine. The method includes measuring a plurality of points on the part when both the part and contact probe are moving continuously between different positions within the coordinate positioning machine. The probe moves, relative to the part, along a scan path such that substantially coincident points that are closely located together along a curve or surface being measured are measured at relatively far apart positions in the machine and at relatively far apart positions along the scan path.

21 Claims, 8 Drawing Sheets

(51) Int. Cl.
   *G01B 5/20* (2006.01)
   *G01B 5/213* (2006.01)
   *G05B 19/401* (2006.01)
(52) U.S. Cl.
   CPC .. *G05B 19/401* (2013.01); *G05B 2219/37043* (2013.01)

(56) References Cited

U.S. PATENT DOCUMENTS

| | | | |
|---|---|---|---|
| 5,204,824 | A | 4/1993 | Fujimaki |
| 6,154,713 | A | 11/2000 | Peter et al. |
| 6,327,788 | B1 | 12/2001 | Seddon et al. |
| 6,697,748 | B1 | 2/2004 | Rosenberg et al. |
| 6,817,108 | B2 | 11/2004 | Eaton |
| 7,036,238 | B2 | 5/2006 | Kojima et al. |
| 7,809,523 | B2 * | 10/2010 | Hunter ............. G01B 21/04 33/503 |
| 7,908,759 | B2 * | 3/2011 | McLean ............ G01B 21/04 33/503 |
| 9,739,607 | B2 | 8/2017 | Michiwaki |
| 2004/0148791 | A1 | 8/2004 | Eaton |
| 2008/0257023 | A1 * | 10/2008 | Jordil ............. G01B 21/045 73/105 |
| 2011/0184695 | A1 * | 7/2011 | Grzesiak ............ G01B 5/008 702/167 |
| 2013/0298415 | A1 | 11/2013 | Kanto |

FOREIGN PATENT DOCUMENTS

| | | |
|---|---|---|
| CN | 102798368 A | 11/2012 |
| EP | 00240151 A2 | 2/1981 |
| EP | 0342770 A2 | 11/1989 |
| EP | 0 426 492 A2 | 5/1991 |
| EP | 0 744 678 A2 | 11/1996 |
| GB | 2 294 327 A | 4/1996 |
| GB | 2 307 988 A | 6/1997 |
| GB | 2 350 429 A | 11/2000 |
| JP | H03-084408 A | 4/1991 |
| JP | H10-300455 A | 11/1998 |
| JP | 2001-264048 A | 9/2001 |
| JP | 2005-337921 A | 12/2005 |
| JP | 2012-507029 A | 3/2012 |
| TW | 201233976 A | 8/2012 |
| TW | 201305533 A | 2/2013 |
| WO | 97/21076 A1 | 6/1997 |
| WO | 2006/114570 A1 | 11/2006 |
| WO | 2007/107776 A1 | 9/2007 |

OTHER PUBLICATIONS

Jul. 7, 2014 International Search Report issued in Patent Application No. PCT/GB2014/050285.
Dec. 18, 2014 Office Action Issued in Taiwanese Patent Application No. 103103823.
Jul. 28, 2013 Search Report issued in British Patent Application No. GB1302012.8.
Nov. 28, 2017 Notice of Rejection issued in Japanese Patent Application No. 2015-556564.
Jan. 30, 2018 Notice of Rejection issued in Chinese Patent Application No. 201480020124.4.
Jun. 5, 2018 Office Action issued in Japanese Patent Application No. 2015-556564.

\* cited by examiner

METHOD AND APPARATUS FOR MEASURING A PART

FIELD OF INVENTION

This invention concerns a method and apparatus for measuring a part. This invention has particular application to measuring a part using a coordinate positioning machine, such as a machine tool or coordinate measuring machine.

BACKGROUND

In machine tools, it is known to measure a part using a contact probe by moving a contact probe along a path such that the probe contacts a surface of the part at a number of points on the surface. A location of the points of contact can be determined from signals from the machine tool and contact probe and an appropriate shape fitted to these points to obtain a representation of the surface. It is also known to rotate the part with the contact probe fixed in position. Examples of these methods are described in U.S. Pat. No. 3,866,829.

In U.S. Pat. No. 3,866,829, the contact probe is movable parallel to the rotational axis to take measurements at different heights on the part. However, it is also known to move the contact probe in a direction perpendicular to the rotational axis such that inner and outer circles of a part can be measured, for example as disclosed in EP0744678.

Errors in the measurement can result in inaccuracies in the generated representation. In particular, in circumstances when the part is rotated and the contact probe is stationary, a diameter of a cylindrical/circular part cannot be measured directly, but the measured position has to be related to a centre of the part in order to determine a diameter. The rotation can provide information on the runout of the part about the centre of rotation, but a position of the centre of rotation cannot be determined directly nor the off-centre error of the part with respect to the centre of rotation. It is also not possible to separate the $1^{st}$ order circularity of the part from the axis centre drift or the off-centre error of the part.

U.S. Pat. No. 4,852,402 discloses a measurement method wherein a contact probe is moved simultaneously with rotation of a gear. The contact probe is moved in a direction that is orthogonal to a movement direction of a point on a surface of the gear tooth in contact with the contact probe. Deviations from an ideal involute shape of the tooth are recorded.

U.S. Pat. No. 6,154,713 discloses a method of determining a path of a contact probe when measuring a part that is simultaneously rotated with movement of the contact probe such that measurement of a surface always occurs in a preferred measurement direction, normal to the surface.

U.S. Pat. No. 6,327,788 discloses a method of measuring a set of radial values of a cylindrical part at a specified height with a nominally straight contact probe by rotating the part relative to the probe when the probe is located at a first, fixed radial position to obtain a first set of radial values and then moving the probe to a second, fixed radial position diametrically opposed to the first position and rotating the part to obtain a second set of radial values. Sets of values may be obtained at each radial position at a plurality of different heights. In this way, for each point on the part, two measurements of radius are obtained. A mean of the measurements of radius at each point is obtained to compensate for errors in the straightness of the contact probe.

In an alternative embodiment, rather than averaging measurements of radius at each point, each set of radial values is fitted to a circle using a least squares algorithm. An average of the fitted circles is obtained. The fitted circle for one of the sets of radial values is then subtracted from the average circle and the result added to the raw radial values of that set.

FIGS. 1a to 1c schematically illustrate this method for a single height wherein a first circle with radius R1 is fitted to radial values obtained for a first position of the contact probe and a second circle with radius R2 is fitted to radial values obtained for a second position of the contact probe. An average radius, AV, is obtained for values R1 and R2. A difference between the average radius AV and a radius for one of the sets of data, in the illustration R1, is then added to the radial values to which the circle with radius R1 was fitted to obtain a data set that represents the final shape.

It is disclosed that this second embodiment reduces angular phase errors which may occur if the angular separation of the two positions of the contact probe are not accurately known (i.e. the "same point" measured for the two positions of the contact probe may be, in fact, slightly different points because of errors in the angular measurement at each position. Therefore, simple averaging of the radial position for each point may be false averaging because the measurements are for slightly different points).

Such a method may cancel out errors resulting from the lack of straightness of the contact probe but errors from other sources, such as the part being off-centre from the axis of rotation, deformation of other parts of the measurement system or runout, may still produce significant inaccuracies in the measurement of the part.

SUMMARY OF INVENTION

According to a first aspect of the invention there is provided a method of measuring a part with a contact probe mounted on a coordinate positioning machine, the method comprising measuring a plurality of points on a surface of the part with the part and contact probe each located at a plurality of different positions within the coordinate positioning machine.

The probe may move, relative to the part, along a scan path such that substantially coincident points that are closely located together along a curve or surface being measured are measured at relatively far apart positions in the machine and at relatively far apart positions along the scan path.

The scan path may comprise multiple scans of substantially the same scan path, the coincident points measured on separate scans of the substantially the same scan path. Accordingly, the same points or points close together on the part may be measured by the probe during different traverses of the scan path. The movement of the part and contact probe in the coordinate measuring machine may be such that different traverses of the same scan path relative to the part comprises travel of the contact probe along different paths relative to the coordinate measuring machine (because the part is also moving relative to the coordinate measuring machine). In this way, points close together on the part may be measured during different traverses of the scan path with the probe located for each measurement at relatively far apart locations in the coordinate measuring machine.

The scan path may comprise a plurality of complete navigations around the part, the coincident points measured on separate complete navigations of the part. Each complete navigation may be around the same circumference of the part. Each complete navigation may be offset in a direction from the other complete navigation(s). The scan path may be a helix or three-dimensional spiral around the part.

The method may comprise, in between measuring the substantially coincident points that are relatively close together on the curve or surface being measured, measuring other points that are further away from each other on the curve or surface being measured than the substantially coincident points.

The method may comprise measuring the plurality of points when both the part and the contact probe are moving continuously between the different positions.

The method enables a large number of "independent" measurements to be taken within a short time period relative to moving the part and/or contact probe once along a scan path and/or in a series of discrete movements. The cloud of measured points obtained at different positions of the part and contact probe in the machine may be analysed together on the assumption that errors for the points are uncorrelated and normally distributed. More specifically, measuring points that are closely located to each other on the part in substantially different locations in the machine volume may reduce measurement uncertainty because each measurement may be considered "independent" with few, if any, systematic errors common to the measurements. With independent measurements, measurement uncertainty falls with $1/\sqrt{N}$, where N is the number of measurements of each point The contact probe may be a multi-axis contact probe, in which measurements can be carried out through deflections of a stylus of the probe in any one of a plurality of measurement directions, the probe generating signals indicative of both magnitude and direction of the deflection, the method comprising moving the contact probe and the part such that the contact probe carries out measurements through deflection of the stylus in at least two of the measurement directions. In this way, systematic errors due to a single measurement direction of the probe may be avoided.

The method may comprise fitting an analytical curve or surface to the plurality of points to obtain a representation of the surface.

Errors in each measurement will depend on the position of the probe and part within the coordinate positioning machine. Fitting an analytical curve or surface to the plurality of points finds a curve or surface that best fits the measured points "averaging" out the errors that occur (or in other words, fitting creates an approximating function that attempts to capture a shape of the part whilst smoothing out variations due to errors). The type of "averaging" will depend on the method used to evaluate the analytical curve or surface that best fits the plurality of points. For example, a least squares algorithm will minimise the sum of the squares of a distance between the points and the analytical curve or surface. Consequently, the resultant representation of the surface will take account of errors from various sources, such as deformations of the contact probe and/or coordinate positioning machine and runout.

The method may comprise rotating the part within the coordinate positioning machine between the different positions. The continuous motion may comprise movement of the probe and the part in non-orthogonal directions. For example, both the part and the contact probe may be moved in opposed directions (clockwise/anticlockwise) along closed paths for the duration in which measurements are obtained. The part and the contact probe may be rotated in opposite directions. Additionally or alternatively, the method may comprise a translation (as opposed to or in addition to a rotation) of the part between the different positions.

The method may comprise transforming a location of each point in a coordinate system of the coordinate positioning machine (hereinafter referred to as "the measurement coordinate system") into a location in a part coordinate system in which relative locations of the points on the part are defined. A position of the part in the coordinate positioning machine may be determined at the time each point is measured, the location of the point within the measurement coordinate system being transformed into the location in the part coordinate system using the determined position of the part. In the case where the part has been rotated, the transformation comprises a rotational transformation of the location based on an angle the part has been rotated through from a reference position.

The curve or surface may be fitted to the points once the points have been transformed into the part coordinate system. The fitting of an analytical curve or surface may comprise a least squares fit, a freeform surface modelling technique, such as a non-uniform rational basis b-spline (NURBS) algorithm, or other suitable fitting algorithm.

The method may comprise determining a path within the coordinate measuring machine for the contact probe to travel based upon an intended displacement of the part during measurement. The path of the contact probe and/or displacement of the part may be selected based upon set criteria. For example, the path of the contact probe and/or displacement of the part may be selected such that the entire surface of the part can be measured within a limited measuring range of the contact probe and/or to ensure measurements are taken across a significant extent of a volume available for such measurements and/or to ensure that accelerations/decelerations of the contact probe and/or mount that moves the part are within defined limits.

The part may be moved to the different positions in discrete steps or in a continuous motion.

The method may comprise moving the contact probe and the part such that the contact probe circumnavigates the part multiple times.

The method may comprise selecting a path of the contact probe and/or a displacement of the part such that the same point or points that are closely located to each other on the part are measured at two or more locations that are relatively far away in the coordinate positioning machine.

According to a second aspect of the invention there is provided a coordinate positioning machine comprising a first mount for mounting a contact probe for movement within the coordinate positioning machine, a second mount for mounting a part for movement within the coordinate positioning machine and a controller for controlling movement of the first and second mounts, wherein the controller is arranged to control movement of the first and second mounts to measure with the contact probe a plurality of points on a surface of the part with the part and contact probe each located at a plurality of different positions within the coordinate positioning machine.

The controller may be arranged to control movement of the first and second mounts to move the probe relative to the part along a scan path such that substantially coincident points that are closely located together along a curve or surface being measured are measured at relatively far apart positions in the machine and at relatively far apart positions along the scan path. Accordingly, points close together on the part may be measured by the probe during different traverses of the scan path. The movement of the part and contact probe in the coordinate measuring machine may be such that different traverses of the same scan path relative to the part comprises travel of the contact probe along different paths relative to the coordinate measuring machine (because the part is also moving relative to the coordinate measuring machine). In this way, points close together on the part may be measured during different traverses of the scan path with the probe located for each measurement at relatively far apart locations in the coordinate measuring machine.

The controller may be arranged to control movement of the first and second mounts to measure with the contact probe the plurality of points when both the part and contact probe are moving continuously between the different positions.

The contact probe may be a multi-axis contact probe, in which measurements can be carried out through deflections of a stylus of the probe in any one of a plurality of measurement directions, the probe generating signals indicative of both magnitude and direction of the deflection, the controller arranged to control movement of the first and second mounts such that, during the continuous motion, the contact probe carries out measurements through deflection of the stylus in at least two of the measurement directions.

The coordinate positioning machine may comprise an evaluation unit for analysing signals from the coordinate positioning machine and contact probe, the evaluation unit arranged to fit an analytical curve or surface to the plurality of points to obtain a representation of the surface.

The coordinate positioning machine may be a machine tool or a coordinate measuring machine (CMM).

According to a third aspect of the invention there is provided a data carrier having instructions thereon, wherein, when the instructions are executed by a processor, the processor is caused to control movement of first and second mounts of a coordinate positioning machine, the first mount for mounting a contact probe within the coordinate positioning machine and a second mount for mounting a part within the coordinate positioning machine, wherein the processor moves the first and second mounts to measure with the contact probe a plurality of points on a surface of the part when both the part and contact probe are moving continuously between different positions within the coordinate positioning machine.

The processor moves the first and second mounts to move the probe, relative to the part, along a scan path such that substantially coincident points that are closely located together along a curve or surface being measured are measured at relatively far apart positions in the machine and at relatively far apart positions along the scan path.

The first mount may be for mounting a multi-axis contact probe, in which measurements can be carried out through deflections of a stylus of the probe in any one of a plurality of measurement directions, the probe generating signals indicative of both magnitude and direction of the deflection, and the processor may control movement of the first and second mounts such that the contact probe carries out measurements through deflection of the stylus in at least two of the measurement directions.

According to a fourth aspect of the invention there is provided a data carrier having instructions thereon, wherein, when the instructions are executed by a processor, the processor is caused to receive measurement data of a plurality of points measured on a surface of a part using a contact probe mounted on a coordinate positioning machine, wherein the plurality of points are obtained with the part and contact probe each located at a plurality of different positions within the coordinate positioning machine, and to fit an analytical curve or surface to the plurality of points to obtain a representation of the surface.

According to a fifth aspect of the invention there is provided a method of measuring a part with a contact probe mounted on a coordinate positioning machine, the method comprising measuring a plurality of points on a surface of the part with the part and contact probe each located at a plurality of different positions within the coordinate positioning machine and transforming each point into a common part coordinate system in which relative locations of the plurality of points on the part are defined based on a determined position of the part in the coordinate positioning machine when the point was measured.

The method may comprise recording part position data on a position of the part relative to a part reference point in the coordinate positioning machine and the transformation of each point into a common part coordinate system is based upon the part position data. The part may be mounted on a rotary table and the position data may be the angular orientation of the rotary table.

According to a sixth aspect of the invention there is provided a coordinate positioning machine comprising a first mount for mounting a contact probe for movement within the coordinate positioning machine, a second mount for mounting a part for movement within the coordinate positioning machine, a controller for controlling movement of the first and second mounts and an evaluation unit for analysing signals from the coordinate positioning machine and contact probe, wherein the controller is arranged to control movement of the first and second mounts to measure with the contact probe a plurality of points on a surface of the part with the part and contact probe each located at a plurality of different positions within the coordinate positioning machine and the evaluation unit is arranged to transform each point into a common part coordinate system in which relative locations of the plurality of points on the part are defined based on a determined position of the part in the coordinate positioning machine when the point was measured.

According to a seventh aspect of the invention there is provided a data carrier having instructions thereon, wherein, when the instructions are executed by a processor, the processor is caused to receive measurement data of a plurality of points measured on a surface of a part using a contact probe mounted on a coordinate positioning machine, wherein the plurality of points are obtained with the part and contact probe each located at a plurality of different positions within the coordinate positioning machine, and to transform each point into a common part coordinate system in which relative locations of the plurality of points on the part are defined based on a determined position of the part in the coordinate positioning machine when the point was measured The instructions, when executed by the processor, may cause the processor to receive part position data together with the measurement data, the determined position of the part being determined from the part position data. Each point of the plurality of points may be associated with a part position contained in the part position data.

The data carrier of the above aspects of the invention may be a suitable medium for providing a machine with instructions such as non-transient data carrier, for example a floppy disk, a CD ROM, a DVD ROM/RAM (including—R/-RW and +R/+RW), an HD DVD, a Blu Ray™ disc, a memory (such as a Memory Stick™, an SD card, a compact flash card, or the like), a disc drive (such as a hard disk drive), a tape, any magneto/optical storage, or a transient data carrier, such as a signal on a wire or fiber optic or a wireless signal, for example a signals sent over a wired or wireless network (such as an Internet download, an FTP transfer, or the like).

DESCRIPTION OF EMBODIMENTS

Figure 1A:
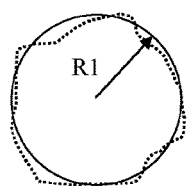
FIGS. 1a, 1b and 1c show a prior art method of measuring a cylindrical part.
Figure 1B:
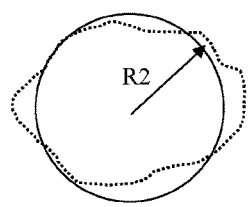
Figure 1C:
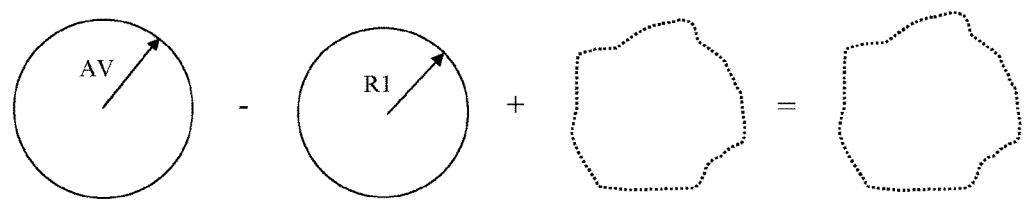
Figure 2:
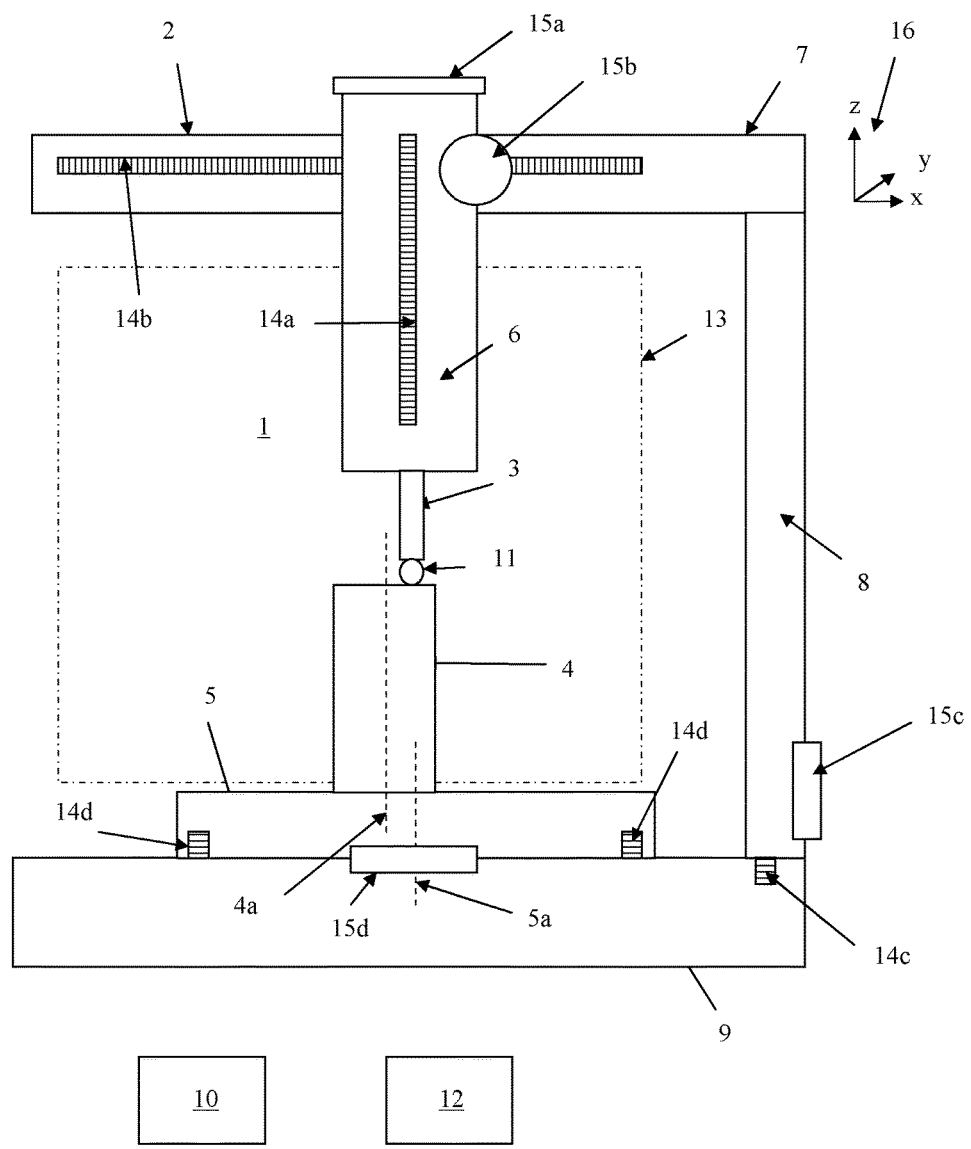
FIG. 2 is a schematic view of apparatus according to one embodiment of the invention.

Referring to FIG. 2, a coordinate positioning machine 1 comprises a machine tool 2 and a contact probe 3, in this embodiment a multi-axis contact probe, mounted on the machine tool 2 for measuring a part 4. The machine tool comprises a rotary table 5 on which the part 4 can be mounted. The rotary table 5 comprises a rotary axis 5a The contact probe 3 is mounted to a quill 6 which is mounted on arms 7 and 8 such that the contact probe 3 can be moved in three linear directions, x, y and z relative to a base 9. The extent of movement of the probe 3 will be constrained by the construction of the machine tool 2 and may not extend across the entire volume of a part mounted in the machine tool 2. In this embodiment, the volume within which the probe 3 can move is indicated by dotted and dashed box 13.

Motors 15a, 15b, 15c, 15d move the rotary table 5, quill 6 and arms 7 and 8 under the control of controller 10, such as processor programmed with suitable software. Encoders 14a, 14b, 14c, 14d in the quill 6, arms 7,8 and rotary table 5 generate signals indicative of positions of the table 5, quill 6 and arms 7,8 from which a location of the contact probe 3 and part 4 in a measurement coordinate system 16 of the machine tool 2 can be determined.

The contact probe 3 has transducers that generate a signal when the probe 3 is deflected, such as through contact with the part 4. From the signals generated by the contact probe 5 and the encoders 14a, 14b, 14c, 14d, points of contact of the probe tip 11 with the part 4 can be determined within the measurement system. A plurality of points on the part 4 measured in this way are recorded and processed by evaluation unit 12, which may be a processor programmed with suitable software and may be the same or a different processor to that used for the controller 10. The contact probe 3 may communicate with the evaluation unit 12 wirelessly.

A method of measuring a part with the coordinate positioning machine 1 in accordance with an embodiment of the invention will now be described with reference to FIGS. 3a, 3b and 4. In this embodiment, the part 4 is nominally cylindrical and mounted on the rotary table 5 such that its central axis 4a approximately aligns with the rotary axis 5a of the rotary table 5. Measurements of points on the surface of the part 4 are recorded by rotating the table 5 in one rotary direction (in the drawings, anticlockwise) and simultaneously moving the contact probe 3 along a path 11a relative to the machine tool 2, in this embodiment a circular path, in the other direction (in the drawings, clockwise). The combined motion of the part 4 and probe 3 causes the contact probe 3 to traverse a scan path 20 (indicated by the dotted lines in FIG. 3b) relative to the part 4 that allows to contact probe 11 to measure points spaced around a circumference of the part 6. The rotation of the table 5 and movement of the probe 3 is carried out as a continuous movement, although discrete steps are possible but less desirable. Measurements may be recorded continuously, for example, if the contact probe 3 is a scanning probe, or as a number of discrete points, for example if the contact probe 3 is a touch trigger probe.

The signals from the contact probe 3 and the encoders 14a, 14b, 14c of the machine tool 2 and encoder 14d of the rotary table 5 are sent to the evaluation unit 12. The evaluation unit 12 determines a location P of points measured using the contact probe 3 in the measurement coordinate system 16 of the machine tool 2. In FIG. 4, individual measurements of points on the part 4 for particular locations of the probe 3 and part 4 are shown in column A and column B shows these points plotted together in the coordinate system 16 of the machine tool 12. The evaluation unit then transforms, in this embodiment, by a suitable rotational transformation T, the locations P of these points into locations PC in a part coordinate system, as shown in column C, wherein the relative positions of the points on the part 4 are defined. The rotation T required to transform a location P in the measurement coordinate system 16 into a location PC in the part coordinate system may be determined from a position of the part 4 in the machine tool 2 when the point was measured relative to a reference position, such as a position of the part 4 when the first point is measured. The transformation T may be determined from the angle (indicated by the arc between the dotted (initial position) and solid (current position) in the plots of column A) the rotary table 4 has rotated through between the two measurements, which can be determined from the signals of the encoder 14d in the rotary table 5.

In this embodiment, the part 4 is rotated though 180° and the path travelled by the probe 3 in the machine tool is an arc of 180° in the opposite direction. In this way, the time taken to navigate the entire circumference of the part 4 is less than would be case if only the rotary table 4 or probe 3 was moved at the same speed.

An analytical curve 15 is then fitted to the points in the part coordinate system, such as using a least square fit algorithm, to obtain a representation of the part 4. This is illustrated by the last plot in column C of FIG. 4.

Figure 5:
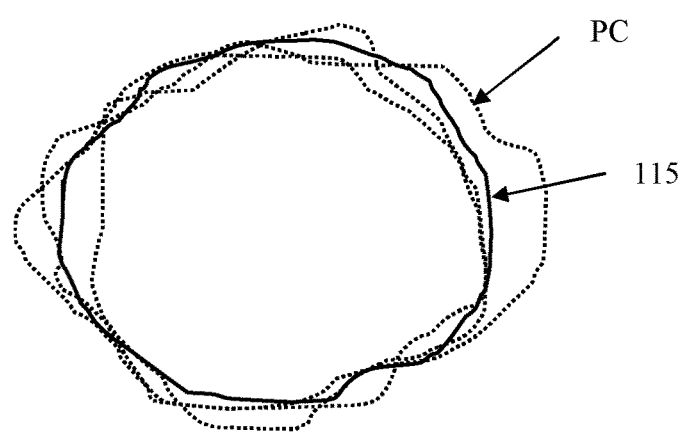
FIG. 5 shows a method of fitting a curve to a plurality of points measured on a part in accordance with an embodiment of the invention.

In another embodiment, a path of the probe 3 and/or a rotation of the rotary table 5 are such that the contact probe 2 traverses the same scan path 20 relative to the part 4 multiple times such that the same points or points close together on the surface of the part 4 can be measured by the probe during different traverses of the scan path 20. Accordingly, substantially coincident points that are closely located to each other on the part 4 may be measured in two or more locations P that are relatively far away in the machine tool 2 and at relatively far apart positions along the scan path 20. The locations P of these points are transformed into locations PC in the part coordinate system and an illustration of a cloud of points that may result from such a method is shown in FIG. 5. A curve 115 is fitted to all points PC of the cloud to obtain a representation of the part. Such a method may reduce measurement uncertainty as the measurement of the same points or points that are closely located together on the part 4 at relatively far apart locations in the machine tool 2 may be considered as substantially independent such that reduction in measurement uncertainty with revolutions of the probe 3 around the part 4 will tend towards $1/\sqrt{N}$, where N is the number of revolutions.

Figure 3A:
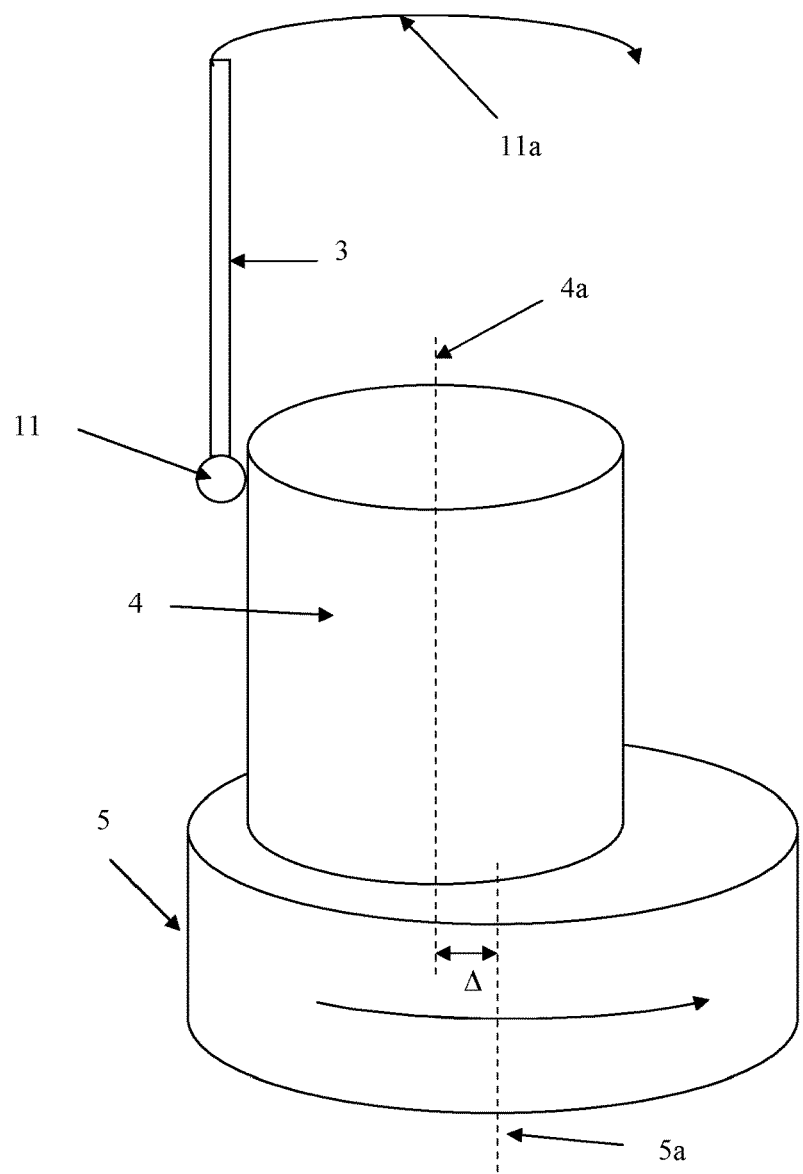
FIG. 3a is a perspective view of a cylindrical part being measured in accordance with an embodiment of the invention.
Figure 3B:
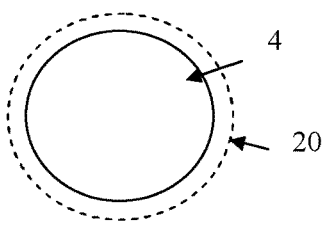
FIG. 3b shows a scan path relative to the cylindrical part traversed by the contact probe.
Figure 4:
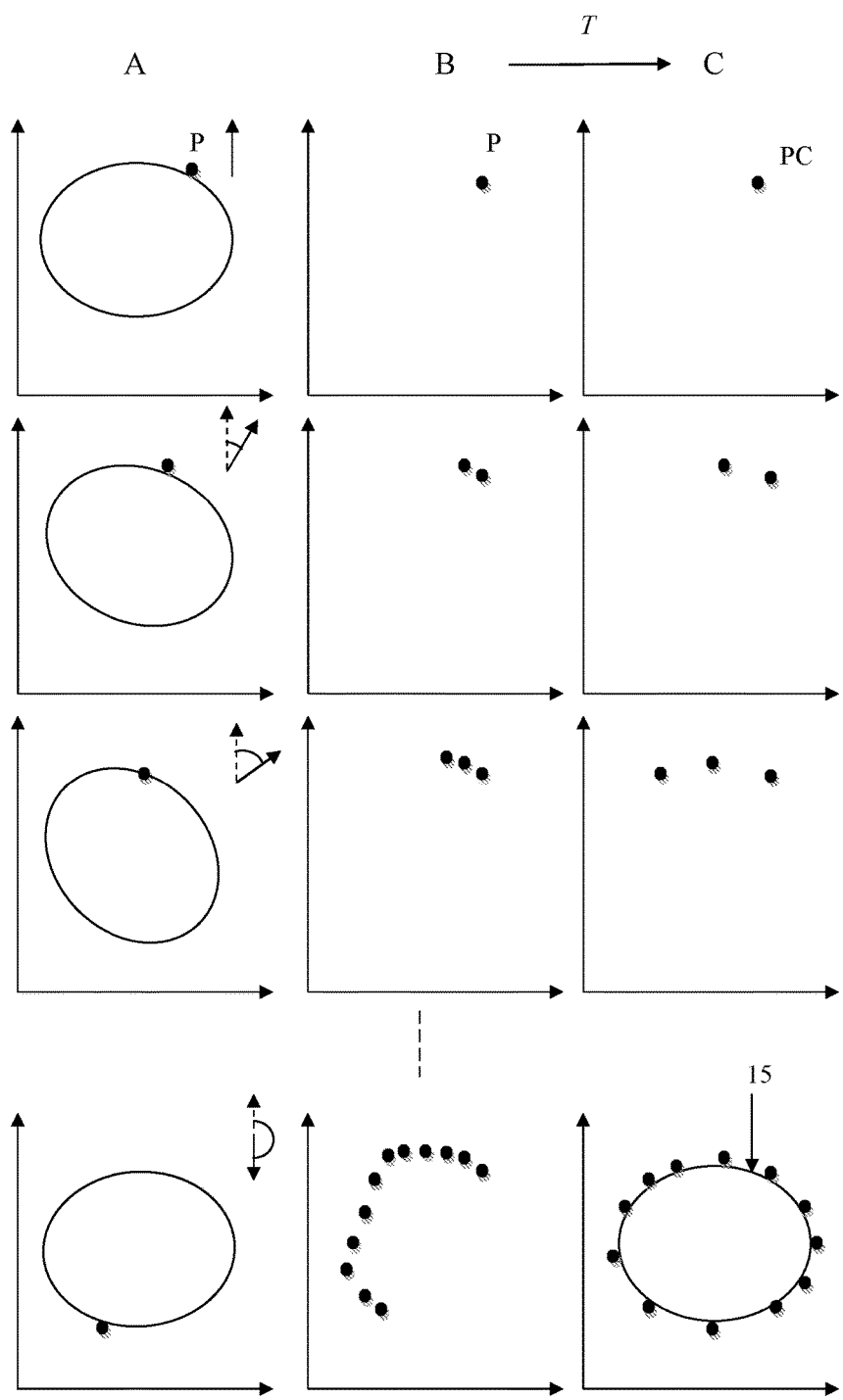
FIG. 4 is a flow chart illustrating the recording and processing of data measured using the method shown in FIG. 3.
Figure 6A:
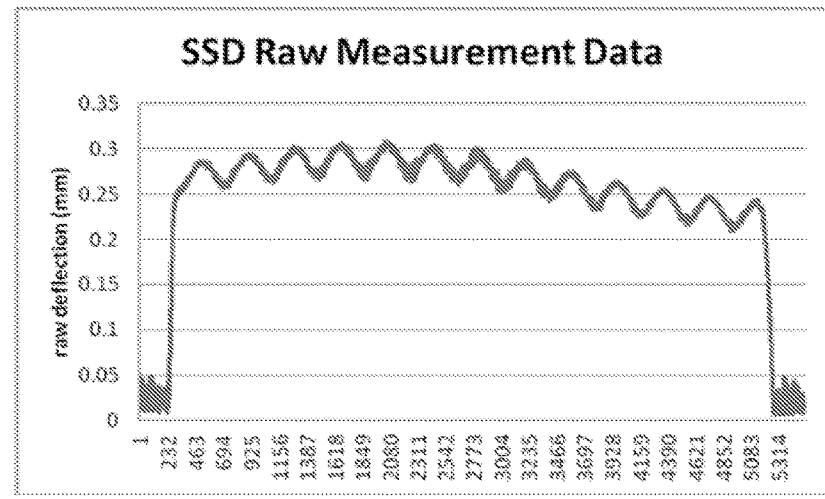
FIG. 6a is a data plot of probe deflection obtained when carrying out a measurement using a method according to an embodiment of the invention.

As illustrated in FIG. 3*a*, the centre of the part 4 may be offset by a distance, A, from the rotational axis 5*a* of the rotary table 5. (In FIG. 3*a* the offset is exaggerated for clarity). During processing of the measurements, initially, it may be assumed that the part 4 is centred about a location of a rotational axis 5*a* of rotary table 5 and that the location of the rotational axis 5*a* is a location previously determined, for example using a calibration. However, the location of the rotational axis 5*a* may differ from the previously determined location, for example due to the weight of the part 4, drift over time, temperature changes, etc. Using locations in the analysis that are offset from the actual locations of the rotational axis and centre 4*a* of the part 4 can result in sinusoidal artefacts in the probe deflection data, as shown in FIG. 6*a*. The half-cycle sinusoid is caused by the probe's movement in the machine volume not being centred about the rotational axis 5*a*. This sinusoid gives information about the centre 5*a* of rotation of the part 4 and the diameter of the part 4. The higher frequency sinusoid is caused by the centre 4*a* of the part 4 being misaligned with the rotational axis 5*a*. This higher frequency sinusoid gives you information about the offset of the centre of the part 4 from the rotational axis 5*a* and the roundness of the part 4. The large deflection that is seen at the start and end of FIG. 6*a* is the probe contacting and leaving the surface of the part.

Figure 6B:
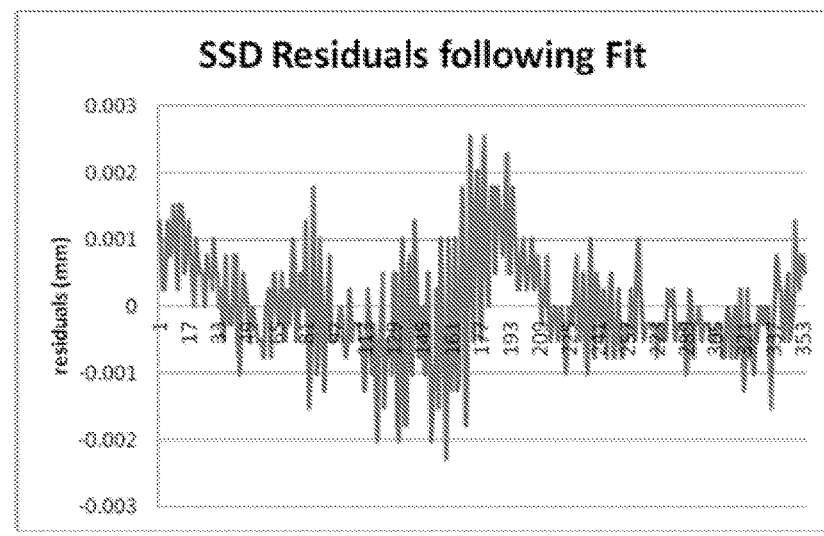
FIG. 6b is a data plot of residuals within the probe deflection data shown in FIG. 6a following compensation for offsets in the rotation axis and part centre from expected locations.

By adding an appropriate offset in the X and Y directions to the assumed centre of the part 4 and assumed location of the rotational axis when analysing the results these sinusoidal artefacts in the measurement results can be reduced or even eliminated, as shown in FIG. 6*b* (leaving simply a deviation of the point from a baseline, such as a probe position relative to the part). The appropriate offset may be determined from sinusoidal functions fitted to the data. A magnitude of the offset may be determined from the amplitude of the sinusoid and a direction from the phase. Offsets may have to be calculated along the Z-axis as the rotational axis 5*a* may not be parallel to the Z-axis of the probe 3.

The appropriate offset may be determined in an iterative process, wherein, in each iteration, the points measured in the machine's coordinate system are transformed into the part coordinate system based upon a position of the part 4 determined using the current assumed position for the rotational axis. In the part coordinate system, sinusoidal functions are fitted to the points PC and offsets determined for each of the rotational axis and centre of the part. The result is analysed to determine if any sinusoidal artefact remains. If so, the new positions (old positions plus offset) for the rotational axis and centre of the part are used in the next iteration. This process continues until the sinusoidal artefact is eliminated or reduced below an acceptable level. The measured offset of the centre of the part 4 from the rotational axis 5*a* and the location of the rotational axis is then taken to be that determined in the final iteration.

Figure 7A:
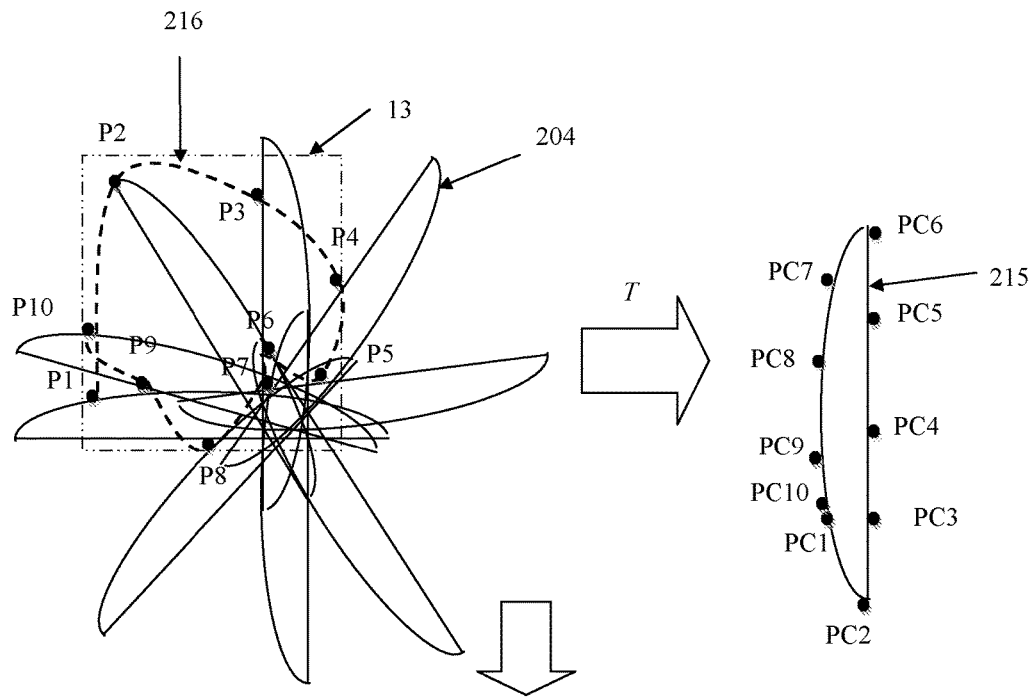
FIG. 7a is a schematic view of a further part being measured in accordance with an embodiment of the invention.
Figure 7B:
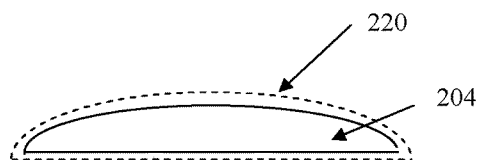
FIG. 7b shows a scan path relative to the further part traversed by the contact probe.

FIGS. 7*a* and 7*b* illustrate a further embodiment of the invention, wherein a non-cylindrical part 204 is measured. In this example, the non-cylindrical part 204 has a length that is greater than the dimensions of the volume 13 within which the probe 3 can move. The part 204 is mounted on the rotary table 5. Rotation of the part 204 and the path 216 of the probe 3 in the machine tool 2 are selected such that an entire circumference of a surface on the part 204 can be measured even though the points on the part 204 that are measured may at certain orientations of the part 204 fall outside the volume 13 in which the probe 3 can measure a part, as illustrated in FIG. 5. The scan path 220 of the contact probe 3 relative to the part 204 is shown in FIG. 7*b*.

As in the previous embodiment, the locations P of the points measured in the coordinate system 16 of the machine tool 2 are transformed T into locations PC in the part coordinate system. A curve 215 is fitted to the points in the part coordinate system to obtain a representation of the part. Not shown in FIG. 7*a* but, in practice, the contact probe 3 will traverse the scan path 220 multiple times, whereas the path 216 of the contact probe within the machine tool 2 may only be traversed once or at least fewer times than the scan path 220. This allows points, such as PC1 and PC10 that are relatively close together on the part 204 to be measured at relatively far apart positions in the coordinate positioning machine 2.

In another embodiment, rather than fitting a 2-dimensional curve to a set of points that are believed to be within the same plane, points may be measured in 3-dimensions and a 3-dimensional surface may be fitted to measured points when transformed into the part coordinate system.

Figure 8:
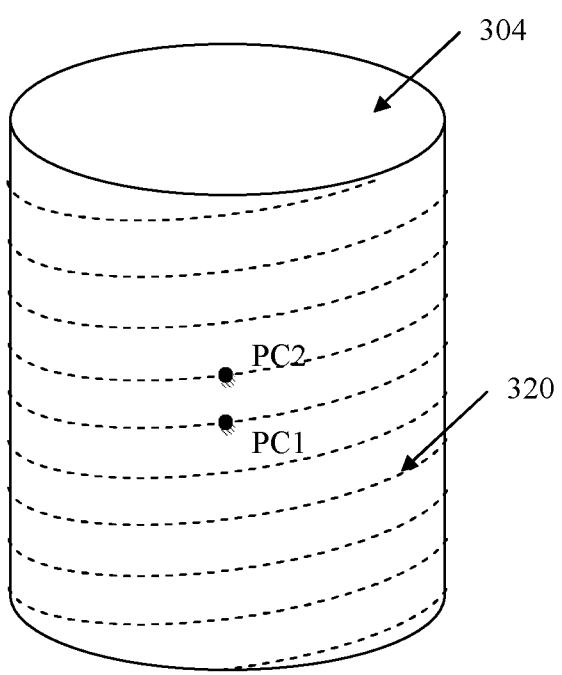
FIG. 8 shows a schematic view of another part and a scan path around the part.

FIG. 8 is an example of the fitting of a surface to the plurality of measured points. In this embodiment, the part 304 is a cylindrical shaped part. As before, the part 304 is scanned by moving the part 304 simultaneously with movement of the probe. In this embodiment, the movement is such that the probe traverses a helical scan path 320 relative to the part 304. For example the part 304 may be rotated simultaneously with rotational and translational (such as in the z-direction) movement of the probe. In such an arrangement, each point PC1, PC2 is only scanned once However, the turns of the helical path 320 are sufficiently tight relative to the size of the surface being measured (typically, the turns being tighter than those shown in the drawings, such a feature not being shown for reasons of clarity) that corresponding points PC1, PC2 on adjacent turns are close enough to each other on the surface to be considered substantially coincident (each turn thus being a scan along substantially the same path as a previous scan). In particular, any variation in the surface that may occur between adjacent turns and corresponding points PC1 and PC2 is relatively small compared to errors in measurement that may originate from the probe or coordinate positioning machine. In one sense this is similar to the 2-dimensional embodiments described above, wherein measuring the exact same point on each traversal of the scan path may not be possible but it is sufficient that the measured points are sufficiently close together to capture any deviations in the surface that are within the measurement errors of the machine.

The movement of the part 304 and probe are selected such that corresponding points PC1, PC2 on adjacent turns of the helical are measured at relatively far apart positions in the machine. In this way, the measurements can be considered "independent". Furthermore, in moving between points PC1 and PC1, the probe travels a distance along the scan path 320 that is much greater than the distance between the points PC1, PC2 on the surface being measured; in other words, the scan path is chosen such that the probe returns to a point PC2 substantially coincident with a previously scanned point PC1 after having scanned points that are not coincident with point PC1. In this way, measurement data can be collected on other measurement points as the part and probe are shifted to a new location in which corresponding point PC2 is to be measured.

It will be understood that the scanning method described with reference to FIG. 8 could be applied to other shaped parts, and is particularly appropriate for shapes comprising a curved surface, such as other cylindrical shapes, cones, annuli, bores or the like.

It will be understood that modifications and alterations may be made to the above described embodiments without departing from the scope of the invention as defined herein.

The invention claimed is:

1. A method of measuring a part with a contact probe mounted on a coordinate positioning machine, the method comprising measuring a plurality of points on the part when both the part and contact probe are moving continuously between different positions within the coordinate positioning machine, the probe moving to measure a plurality of sets of substantially coincident points on the part such that the substantially coincident points of each set are measured at spaced apart positions in the coordinate positioning machine and at spaced apart positions along a scan path, defined in a reference frame of the part,
wherein, for each set, between measuring the substantially coincident points of the set, the contact probe measures at least one point that is non-coincident therewith.

2. A method according to claim 1, wherein, the scan path comprises multiple scans of substantially the same scan path, the substantially coincident points measured on separate scans of the substantially the same scan path.

3. A method according to claim 1, wherein the scan path comprises a plurality of complete navigations around the part, the substantially coincident points measured on separate complete navigations of the part.

4. A method according to claim 3, wherein each complete navigation is around the same circumference of the part.

5. A method according to claim 3, wherein each complete navigation is offset from the other complete navigations.

6. A method according to claim 5, wherein the scan path is a helix or three-dimensional spiral around the part.

7. A method according to claim 1, wherein the continuous motion comprises movement of the probe and the part in non-orthogonal directions.

8. A method according to claim 1, wherein the contact probe is a multi-axis contact probe, in which measurements can be carried out through deflection of a stylus of the probe in any one of a plurality of measurement directions, the probe generating signals indicative of both magnitude and direction of the deflection, the method comprising moving the contact probe and the part such that, during the continuous motion, the contact probe carries out measurements through deflection of the stylus in at least two of the measurement directions.

9. A method according to claim 1, comprising fitting an analytical curve or surface to the plurality of points to obtain a representation of the part.

10. A method according to claim 1, comprising transforming a measured location for each point in a measurement coordinate system into a location in a part coordinate system in which relative positions of the points on the part are defined.

11. A method according to claim 10, wherein a position of the part in the coordinate positioning machine is determined at the time each point is measured, the measured location of the point within the coordinate positioning machine transformed into the location in the part coordinate system using the determined position of the part.

12. A method according to claim 1, comprising rotating the part within the coordinate positioning machine between the different positions.

13. A method according to claim 1, comprising a translation of the part within the coordinate positioning machine between the different positions.

14. A method according to claim 1, comprising determining a path for the contact probe to travel based upon an intended displacement of the part during measurement.

15. A method according to claim 14, wherein the path of the contact probe and/or displacement of the part is selected based upon set criteria.

16. A method according to claim 15, wherein the set criteria comprise a limited measurement range of the contact probe.

17. A method according to claim 15, comprising selecting a path of the contact probe and/or a displacement of the part such that points that are closely located to each other on the part are measured at two or more locations that are relatively far away in the coordinate positioning machine.

18. A method according to claim 1, wherein a distance between the substantially coincident points is smaller in the reference frame of the part than a distance between the spaced apart positions in which the substantially coincident points are measured in the coordinate positioning machine and along the scan path.

19. A method according to claim 9, comprising transforming a measured location of each point in a measurement coordinate system into a location in a part coordinate system in which relative positions of the points on the part are defined, wherein the curve or surface is fitted to the points once the points have been transformed into the part coordinate system.

20. A coordinate positioning machine comprising:
a first mount for mounting a contact probe for movement within the coordinate positioning machine; and
a second mount for mounting a part for movement within the coordinate positioning machine and a controller for controlling movement of the first and second mounts,
wherein the controller is arranged to control movement of the first and second mounts to measure with the contact probe a plurality of points on a surface of the part when both the part and contact probe are moving continuously between different positions within the coordinate positioning machine, the probe moving to measure a plurality of sets of substantially coincident points on the part such that the substantially coincident points of each set are measured at spaced apart positions in the machine and at spaced apart positions along a scan path, defined in a reference frame of the part, and
for each set, between measuring the substantially coincident points of the set, the contact probe measures at least one point that is non-coincident therewith.

21. A non-transitory data carrier having instructions thereon, wherein, when the instructions are executed by a processor, the processor is caused to control movement of first and second mounts of a coordinate positioning machine, the first mount for mounting a contact probe within the coordinate positioning machine and a second mount for mounting a part within the coordinate positioning machine,
  wherein the processor moves the first and second mounts to measure with the contact probe a plurality of points on a surface of the part when both the part and contact probe are moving continuously between different positions within the coordinate positioning machine, the probe moving to measure a plurality of sets of substantially coincident points on the part such that the substantially coincident points of each set are measured at spaced apart positions in the machine and at spaced apart positions along a scan path, defined in a reference frame of the part, and
  for each set, between measuring the substantially coincident points of the set, the contact probe measures at least one point that is non-coincident therewith.

* * * * *